(12) United States Patent
Zhang et al.

(10) Patent No.: US 7,212,566 B2
(45) Date of Patent: May 1, 2007

(54) APPARATUS, AND ASSOCIATED METHOD, FOR PERFORMING JOINT EQUALIZATION IN A MULTIPLE-INPUT, MULTIPLE-OUTPUT COMMUNICATION SYSTEM

(75) Inventors: Jianzhong Zhang, Irving, TX (US); Kiran Kuchi, Irving, TX (US); Heikki Berg, Tampere (FI)

(73) Assignee: Nokia Corporation, Espoo (FI)

( * ) Notice: Subject to any disclaimer, the term of this patent is extended or adjusted under 35 U.S.C. 154(b) by 905 days.

(21) Appl. No.: 10/180,237

(22) Filed: Jun. 26, 2002

(65) Prior Publication Data

US 2004/0001537 A1     Jan. 1, 2004

(51) Int. Cl.
*H03H 7/30* (2006.01)
*H04B 7/10* (2006.01)

(52) U.S. Cl. .................. 375/229; 375/347; 375/267
(58) Field of Classification Search ........... 375/267, 375/299, 229, 232, 233, 347
See application file for complete search history.

(56) References Cited

U.S. PATENT DOCUMENTS 6,870,882 B1* 3/2005 Al-Dhahir et al. .......... 375/233

2003/0053535 A1* 3/2003 Malkov et al. ............. 375/233
2003/0076908 A1* 4/2003 Huang et al. ............... 375/350

OTHER PUBLICATIONS

Reduced-State MIMO Sequence Detection with Application to EDGE sytems, Zhang et al. IEEE transaction on wireless comm. vol. 4, No. 3 May 2005.*
Reduced-state sequence estimation with set partitioning and Decision feedback. Eyuboglu et al. IEEE Transaction on comm. vol. 36, No. 1 Jan. 1988.*
Spatial Diversity Equalization for MIMO Ocean Acoustic Coomunication channels. Bong-Gee Song et al IEEE journal of oceanic Eng. vol. 21, No. 4, Oct. 1996.*

* cited by examiner

*Primary Examiner*—Temesghen Ghebretinsae
(74) *Attorney, Agent, or Firm*—Alston & Bird LLP (57) ABSTRACT

Apparatus, and an associated method, for performing joint equalization of received data vectors, received during operation of a multiple-input, multiple-output communication system. Slicing operations, implemented alternately as group slicing operations, decoupled slicing operations, and successive slicing operations are implemented at a joint equalizer of a receiving station of the multiple-input, multiple-output communication system. Once jointly equalized, equalized data vectors are provided to a joint decoder.

22 Claims, 3 Drawing Sheets

Each Path In The Trellis Is Comprised Of 16 Parallel Transitions

FIG. 6 ial joint equalization proce
APPARATUS, AND ASSOCIATED METHOD, FOR PERFORMING JOINT EQUALIZATION IN A MULTIPLE-INPUT, MULTIPLE-OUTPUT COMMUNICATION SYSTEM The present invention relates generally to a manner by which to recover the informational content of data communicated during operation of a multiple-input, multiple-output (MIMO) communication system. More particularly, the present invention relates to apparatus, and an associated method, by which to perform joint equalization upon received data vectors, received at a receiving station of the MIMO system. Slicing operations are performed upon parallel transitions between symbols of received data vectors upon which joint equalization is performed. The complexity of computations required to perform joint equalization is reduced relative to conventional joint equalization procedures, and the level of complexity required of the computations permits joint equalization to be effectuated utilizing state of the art processing devices.

BACKGROUND OF THE INVENTION

A communication system provides for the communication of data between a sending station and a receiving station. The data is communicated between the sending and receiving stations by way of a communication channel that interconnects such stations. Data sourced at the sending station is converted into a form to permit its communication upon the communication channel. And, once delivered to the receiving station, recovery operations are performed upon the communicated data to recover the informational content thereof.

A radio communication system is an exemplary type of communication system. Communication channels defined in a radio communication system are defined upon radio links extending between the sending and receiving stations operable therein.

Because radio channels are utilized to communicate data between the sending and receiving stations, the need otherwise to install fixed, wireline connections to interconnect the sending and receiving stations, and to define communication channels thereon, is obviated. Therefore, infrastructure costs associated with the installation of a radio communication system are generally less than the corresponding infrastructure costs required to install the infrastructure of a wireline communication system. And, mobility can be provided to the communication stations operable in a radio communication system, thereby permitting mobile communications to be effectuated.

A cellular communication system is a type of radio communication system. Cellular communication systems have been installed throughout significant parts of the populated portions of the world. Cellular communication systems are constructed to be operable in compliance with operating specifications of any of various operating specifications.

A cellular communication system includes a network infrastructure that is installed throughout a geographical area that is to be encompassed by the communication system. The network infrastructure typically includes a plurality of fixed-site radio transceivers, referred to as base-transceiver stations, positioned at spaced-apart locations of the geographical area. Each of the base transceiver stations defines a region, referred to as a cell from which a cellular communication system derives its name.

Subscriber stations, usually referred to as mobile stations, positioned within the proximity of individual ones of the base transceiver stations are capable of communications therewith, thereby to permit effectuation of communication of data between the mobile station and a base transceiver station. Generally, a user of a mobile station is permitted access to the communication system to communicate there through the purchase of a service subscription for service in the communication system.

The radio communication channel defined upon the radio link extending between a mobile station and a base transceiver station usually exhibits non-ideal communication conditions. Radio communication channels defined in other types of radio communication systems, as well as communication channels defined in other types of communication systems, also usually exhibit non-ideal communication conditions. Data communicated upon such communication channels is distorted due to the non-ideal channel conditions. If the distortion is significant, the informational content of the communicated data cannot accurately be recovered at the receiving station.

A significant contribution to the distortion introduced upon the communicated data is due to fading conditions caused by multi-path transmission of the data. The fading might alter the values of information-bearing bits of the data during its communication upon the radio, or other, communication channel. Various techniques are utilized to compensate for the distortion introduced upon the data during its communication, thereby, to facilitate recovery of the informational content of the communicated data.

Generally, increase in the redundancy of the data that is communicated upon the communication channel increases the likelihood that the informational content of the data can be recovered, in spite of the fading exhibited upon the communication channel.

Encoding, techniques, for instance, are sometimes utilized to introduce time redundancy into the data. Introduction of time redundancy is sometimes referred to as creation of time diversity.

Spatial redundancy is sometimes also utilized. Spatial redundancy, sometimes referred to as space diversity, generally refers to the utilization of more than one transmit antenna transducer at a sending station from which to transmit data, upon separate physical paths, to the receiving station. Fading exhibited on one path might well not be exhibited on another path. And, a receiving station sometimes also utilizes more than one antenna transducer at which communicated data is detected and transduced into electrical form.

A communication system in which multiple transmit antennas and multiple receive antennas are utilized is sometimes referred to as a MIMO (multiple-input, multiple-output) communication system. In a MIMO communication system, independent data streams can be transmitted at different ones of the multiple transmit antennas. Communications in a MIMO system not only provide for improved communications upon non-ideal channels, but also permit the data throughput rate in such a communication system to be increased, generally corresponding to the increase in the number of transmit antennas. That is to say, the potential data throughput increase is linearly related with the number of transmit antennas systems that are utilized. And, to realize the potential data throughput increase permitted through the use of a MIMO system, the receiving station must also be able reliably to detect each of the individual data streams communicated by the sending station, in the presence of interference, that distorts the data caused by both inter-symbol interference (ISI) and interference caused by other data streams.

Optimally, the receiving station performs joint detection upon the multiple data streams. However, the complexity of equalization operations that are required to be performed pursuant to the joint detection increases exponentially, both with the number of transmit antennas and also with the length of the channel memory. The complexity of the equalization operations becomes so significant as generally to limit the practical utility of joint detection in many applications.

As recovery of the informational content of communicated data at a receiving station of a multiple-input, multiple-output communication system is facilitated through the use of joint detection utilizing joint equalization, any manner by which to facilitate joint equalization at a receiving station would be advantageous. And, more particularly, any manner by which to permit joint equalization operations to be performed at lessened levels of computational complexity would be advantageous.

It is in light of this background information related to communications in a MIMO communication system that the significant improvements of the present invention have evolved.

SUMMARY OF THE INVENTION

The present invention, accordingly, advantageously provides apparatus, and an associated method, by which to recover the informational content of data communicated during operation of a MIMO (multiple-input, multiple-output) communication system.

Through operation of an embodiment of the present invention, a manner is provided by which to perform joint equalization upon received data vectors, received at a receiving station of the MIMO system.

Slicing operations are performed upon parallel transitions between symbols of received data vectors upon which joint equalization is performed.

The complexity of computations required to perform joint equalization is reduced relative to conventional joint equalization procedures, and the levels of complexity of the computations required to perform the joint equalization is reduced.

In one aspect of the present invention, reduction in the complexity of computations required to be performed at a receiving station to perform joint equalization operations upon received data streams is effectuated by extending the prefilter/set partitioning-based reduced state equalizer structure from a more-conventional SISO (single-input, single-output) receiving station to a MIMO joint receiving station.

In another aspect of the present invention, joint equalization is provided for a MIMO system. Joint equalization is formed of a set-partitioning-based, reduced-state equalization procedure. The joint equalization is provided at a reduced complexity level, and the joint equalization is implementable by conventional, state of the art processing devices.

In another aspect of the present invention, the slicing operations performed pursuant to joint equalization operations are performed upon parallel transitions of symbols of received data vectors. Optimal, as well as sub-optimal, types of slicing operations are performed upon the parallel transitions to achieve a low-complexity manner by which to perform the joint equalization of the data.

The optimal slicing procedure, utilized pursuant to operation of an embodiment of the present invention, permits joint equalization to be performed at a complexity level less than the complexity level required pursuant to a simple, brute-force, search procedure. During operation of another embodiment of the present invention, the joint equalization is performed utilizing a sub-optimal slicing procedure, requiring only a much-reduced number of computations to perform such operations. In one implementation, a decoupled slicing procedure is performed upon symbols of the data streams detected at the receiving station. And, in another implementation, a successive slicing procedure is performed. Both of such procedures permit a significant reduction in the complexity of computations required to perform the joint equalization of the detected data streams.

In one implementation, joint equalization is provided for a receiving station, such as a mobile station, operated in a cellular mobile communication system. The cellular radio communication system forms a MIMO (multiple-input, multiple-output) communication system, having M transmit antennas at a base transceiver station, and N receive antennas at a receiving station. The separate receive antennas transduce into electrical form electrical representations of received data streams, detected at the individual ones of the receive antennas. The electrical representations are first provided to a joint MIMO feed-forward filter. And, separate feed-forward-filtered data streams are provided to the joint equalizer. Joint equalization operations are performed at the joint equalizer. During the joint equalization procedures, slicing operations are performed, either in an optimal manner, or in a sub-optimal manner, to permit the equalization of the data streams to be performed jointly but at a significantly-reduced level of complexity relative to conventional computational requirements.

In these and other aspects, therefore, apparatus, and an associated method, is provided for a multiple-input, multiple-output communication system. The communication system has a receiving station for receiving a first received data vector and at least a second received data vector transmitted to the receiving station upon a communication channel. Joint detection of values of the first and at least second received data vectors is facilitated. A joint equalizer is coupled to receive indications of the first and at least second received data vectors, once received at the receiving station. The joint equalizer forms a first equalized data vector and at least a second equalized data vector. The first and at least second equalized data vectors, respectively, are formed of equalized symbols. The equalized symbols are generated pursuant to slicing operations performed upon parallel transitions of successive symbols of the indications of the first and at least second received data vectors.

A more complete appreciation of the present invention and the scope thereof can be obtained from the accompanying drawings that are briefly summarized below. The following descriptions of the presently-preferred embodiments of the invention, and the appended claims.

DETAILED DESCRIPTION

Figure 1:
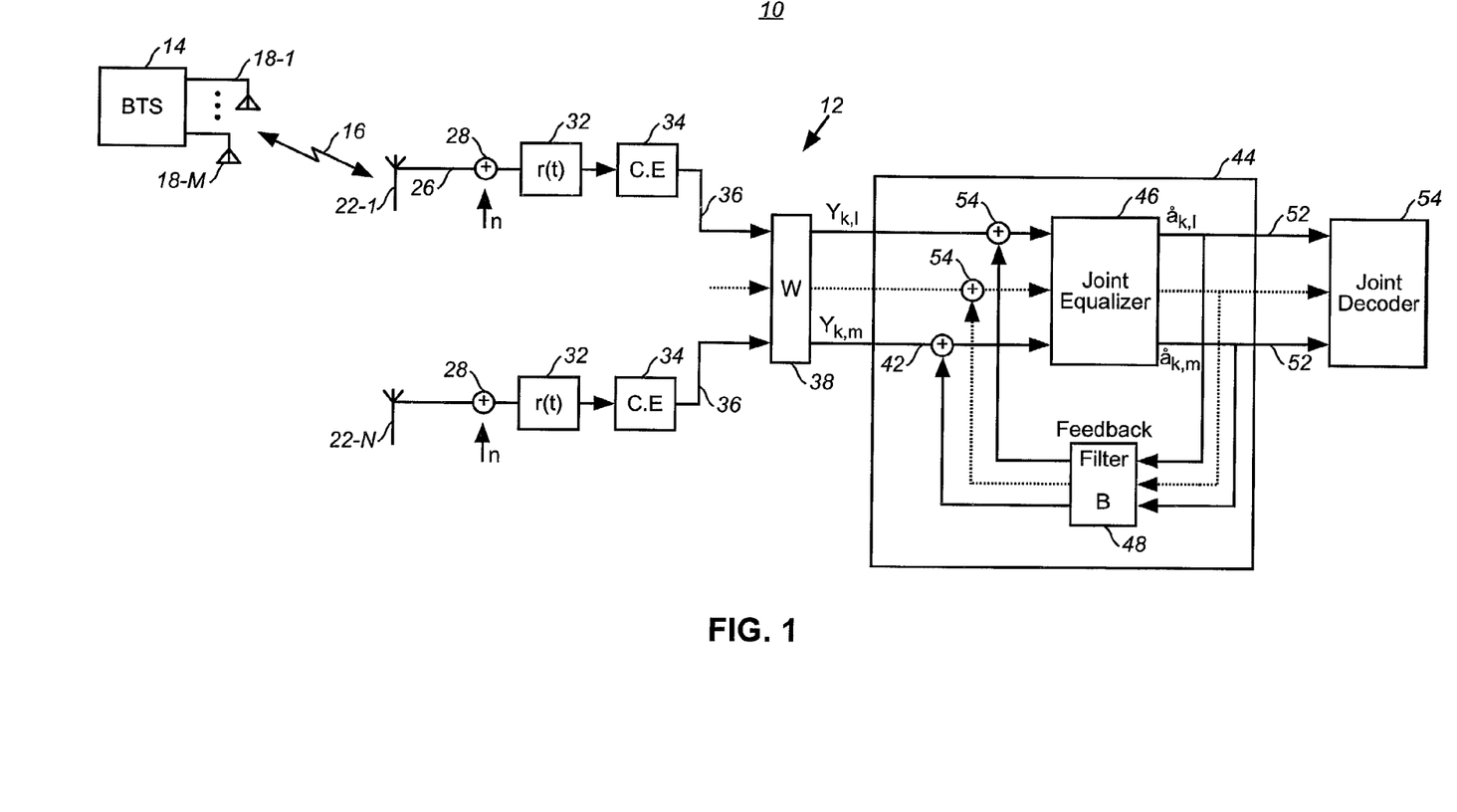
FIG. 1 illustrates a functional block diagram of an exemplary MIMO (multiple-input, multiple-output) communication system in which an embodiment of the present invention is operable.

Referring first to FIG. 1, a MIMO (multiple-input, multiple-output) communication system, shown generally at 10, provides for communication of data between separately-positioned communication stations. Here, the MIMO communication system forms an advanced-generation, cellular communication system. For example, the communication system is representative of a cellular communication system constructed pursuant to a GSM/GPRS/EGPRS (global system for mobile communications/general package radio service/enhanced general packet radio service) communication standard.

The communication system 10 is also representative of other types of MIMO communication system, including cellular communication systems constructed pursuant to other communication standards. For instance, the communication system is also representative of a cellular communication system constructed pursuant to a WCDMA (wideband, code-division, multiple-access) communication standard.

The communication system 10 is here shown to include a network part capable of transceiving data with mobile stations, of which the mobile station 12 is representative. The network part includes a plurality of fixed-site, base transceiver stations, of which the base transceiver station (BTS) 14 is representative. Communication of data is effectuated between the base transceiver station and the mobile station by way of a radio link 16. Forward-link channels are defined upon the radio link upon which to communicate data from the base transceiver station to the mobile station. And, reverse-link channels are defined upon the radio link to extend from the mobile station to the base transceiver station upon which to communicate data from the mobile station to the base transceiver station. While the following description shall describe operation of the communication system on the forward link channels, that is, of the communication of data by the base transceiver station to the mobile station, an embodiment of the present invention can also be implemented, and described, with respect to communications on the reverse link channel from the mobile station to the base transceiver station.

Here, the base transceiver station 14 includes a plurality of M transmit antennas 18. And, the mobile station 12 includes a plurality of N receive antennas 22. Transmit circuitry of the base transceiver station generates forward-link signals that are applied to each of the transmit antennas 18 to be communicated simultaneously upon the forward-link channel of the radio link 16. Separate blocks of data, for instance, are transmitted at separate ones of the transmit antennas.

The communication of data at relatively large data throughput rates is facilitated as the separate blocks of the data can be communicated simultaneously at the separate transmit antennas. The receive antennas at the mobile station, however, detect indications of the data transmitted by, potentially, all of the transmit antennas. And, the mobile station, is required to perform significant amounts of processing to recover the informational content of the data communicated upon the forward-link by each of the transmit antennas. Operation of an embodiment of the present invention facilitates recovery of the informational content of the data communicated thereto while requiring a lessened level of complexity of calculations to recover the informational content.

The mobile station, here forming the receiving station, includes functional elements that operate upon the data detected by the N receive antennas 22. Here, indications of signals detected by the receive antennas are formed on the lines 26 extending from the receive antennas 22, and thereafter to be down mixed from a transmission frequency by mixing elements 28. The mixing elements 28 are functionally represented and are representative, for instance, of multiple-stage down-mixing elements. The received data, once down-mixed, is filtered by receive filters, r(t), 32. And, filtered representations of the received-data, received at respective ones of the receive antennas 22 are provided to joint channel estimators (CE) 34.

Estimated values of the received data estimated by respective ones of the channel estimators are provided, by way of the lines 36, to a joint MIMO feed-forward filter 38. And, joint-filtered representations of the received data are generated on the lines 42.

The lines 42 are coupled to a DFSE (decision feedback sequence estimator) 44 that includes a joint equalizer element 46 operable pursuant to an embodiment of the present invention. The equalizer 44 further includes a feedback filter 48 coupled between output lines 52 and the lines 42, in a feedback arrangement, by way of the summation elements 54. And, lines 52 extend to a joint decoder function 54 that operates to decode equalized values generated by the equalizer 46.

The optimal detector for a MIMO system, and is the joint detection of all the transmitted data streams without channel shortening and decision feedback. The equalizer complexity of this approach is proportional to $Q^{ML}$ with Q being the constellation size, M being the number of transmit antennas and L being the channel length. With Q=8 and L=7 for an EDGE system, even at M=2 the complexity is far beyond practical consideration. A reduced complexity receiver structure as shown in FIG. 1, where the joint equalizer is preceded by a MIMO MMSE-DFSE prefilter 38. This filter greatly reduces the complexity by truncating the effective trellis memory length from L to $L_s$, with a typical value $L_s$=1 or 2. Nevertheless, without further reduction it is still not appropriate for real-time applications. Set partitioning based reduced state joint equalization for further complexity reduction is utilized pursuant to an embodiment of the present invention.

Set partitioning based reduced state equalization is known to reduce the equalizer complexity for a SISO (single-input, single-output) system. The set partitioning principle and trellis structure proposed for the SISO equalizer can be extended in a MIMO joint equalizer. However, one of the key elements of complexity reduction, namely the slicing of the parallel transitions in the trellis, is difficult to implement for a MIMO trellis. In an embodiment of the present invention, both optimal (group slicing) and suboptimal (decoupled slicing and successive slicing) slicing methods for MIMO trellis are provided. Group slicing requires higher complexity but is optimal. Decoupled slicing and successive slicing have similar lower complexity but is in general sub-optimal. The sufficient condition with which the decoupled slicing is optimal are also provided. And, when this condition is not satisfied, successive slicing delivers better tradeoff between complexity and performance.

As shown in FIG. 1, a communication system, an M transmit antenna, N receive antenna EDGE MIMO system 10 is implemented. The receiver 12 jointly detects the M independently transmitted data streams. The joint prefilter used here is, e.g., a FIR MIMO joint prefilter. In a practical system, the FIR MIMO prefilter is capable of improving the channel energy profile, that is, to shift most of the channel energy into the first few taps. With this improved channel profile, decision feedback can be incorporated in the trellis based equalizer to reduce the trellis memory size and overall equalizer complexity, at less risk of catastrophic error propagations.

At time k, the received signal vector after the prefiltering is:

$$y_k = \sum_{i=0}^{L} B_i a_{k-i} + n_k \qquad \text{(equation 1)}$$

Note $y_k$ is the N by 1 received signal vector, $B_0 \ldots, B_L$ are the channel matrices of size N by M and $a_k \ldots a_{k-L}$ are transmitted symbol vectors of size M by 1.

One key assumption that is adopted is the "uniform" MIMO set partitioning for MIMO trellis, that is, the set partitioning rule for each data stream is the same. The set partition rule for the $m^{th}$ data stream is described as $J_m = \{J_1; \ldots; J_{K-1}; 1; \ldots 1\}$, where $K \leq L$ and $J_{K-1} \leq \ldots \leq J_1 \leq 8$. The overall set partition rule is denoted by $J = J_1 \ldots J_M = \{J_1; \ldots J_{K-1}; 1; \ldots 1\}^M$ Note that for each symbol, the symmetric 8PSK set partition tree similar is utilized where $J_k = 8$; 4 or 2.

Figure 2:
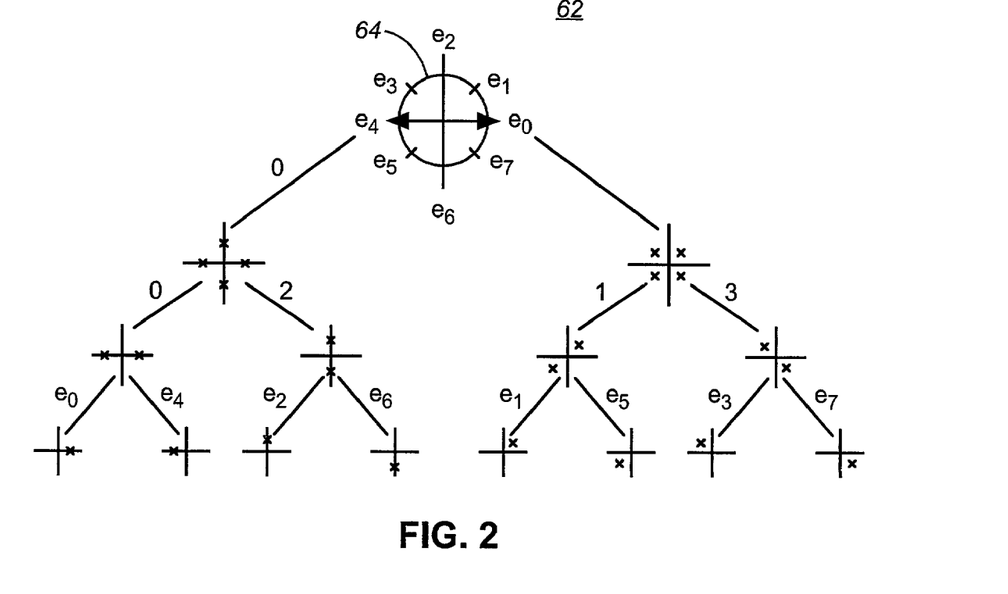
FIG. 2 illustrates a representation of a set partitioning tree of a 8PSK modulation scheme utilized in the communication system shown in FIG. 1 pursuant to the exemplary implementation.

This set partition tree is shown in FIG. 2 generally at 62. the constellation symbols 64 are designated as in FIG. 2, $e_0; \ldots; e_7$ to denote the constellation points, and plain numbers 0; 1 or 0; 1; 2; 3 are used to denote the set indices.

Figure 3:
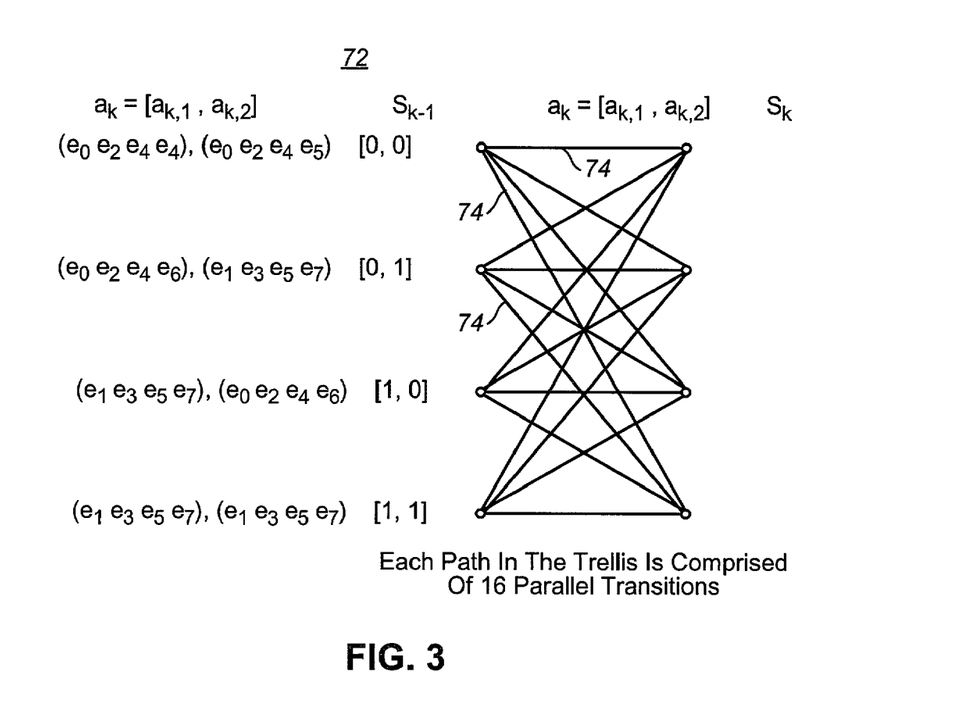
FIG. 3 illustrates the trellis structure of possible parallel transitions between symbols generated during operation of the communication system shown in FIG. 1 in which the modulation scheme shown in FIG. 2 is utilized.

For purposes of example, to illustrate the trellis of the MIMO system, the system 10 shall be described with respect to an implementation having with two transmit antennas 18, where each data stream adopts a 2-state set partition rule. In other words, M=2 and $J=\{2; 1; \ldots; 1\}^2$ The trellis of this particular system is shown in FIG. 3 shown generally at 72. At time k, the Euclidean metric of a particular path is given as a conditional probability given the symbol vectors $a_k; a_{k-1}; \ldots; a_{k-L}$:

$$Pr(y_k \mid a_k; a_{k-L}) = \qquad \text{(equation 2)}$$
$$\frac{1}{(2\pi)^{\frac{M}{2}} |R_{nn}|} \exp\left(y_k - \sum_{i=0}^{L} B_i a_{k-i}\right)^H R_{nn}^{-1} \left(y_k - \sum_{i=0}^{L} B_i a_{k-i}\right)$$

Two problems are unique to the MIMO reduced state equalization. The first problem, the slicing of parallel transitions in MIMO trellis, is key to complexity reduction. While slicing is easy in SISO trellis, it is not trivial in MIMO trellis. Embodiments of the present invention utilize both optimal (group slicing) and sub-optimal slicing (decoupled slicing and successive slicing) algorithms for MIMO system. The successive slicing method provides the best tradeoff in terms of complexity and performance.

Figure 4:
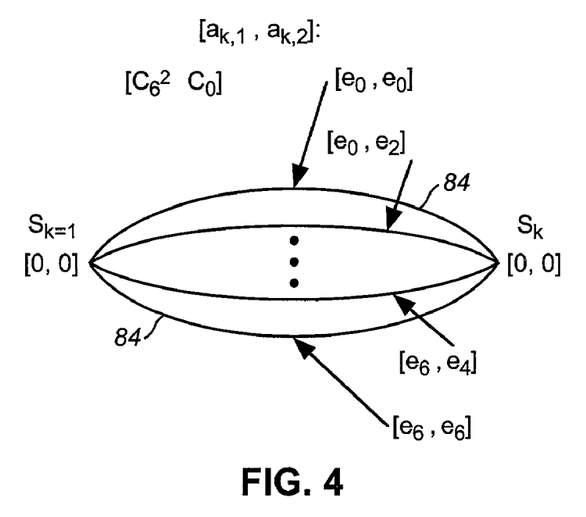
FIG. 4 illustrates a pair of nodes shown in the trellis shown in FIG. 3, here showing the parallel transitions possible therebetween.

In a reduced state trellis, multiple transitions originate from the same node and merge into the same node in two consecutive stages. These transitions are referred to as parallel transitions. Note this is not obvious in the trellis 72 shown in FIG. 3, where the parallel transitions between a pair of nodes with a single line. FIG. 4 illustrates an exemplary parallel transition, shown generally at 82 between a pair of nodes $S_{k-1}=[0;0]$; $S_k=[0;0]$ of the trellis 72 shown in FIG. 3. Shown are the parallel transitions 84 possible between the two nodes in FIG. 4.

For any pair of nodes in the trellis, the best path among all the parallel transitions has to be determined and the Euclidean metric associate with this path becomes the metric of traveling between this pair of nodes. One key element to complexity reduction is to avoid the brute force search of the best path among the parallel transitions. In SISO trellis, the trick is done by a method called slicing. However, the extension of slicing to MIMO trellis is not trivial. Pursuant to an embodiment of the present invention, optimal and sub-optimal versions of slicing algorithms, are provided that offers various tradeoff between complexity and performance.

In a SISO system, slicing operation is performed to determine the most likely path among the parallel transitions. Slicing greatly reduces the complexity of the overall algorithm by eliminating most of the path metric computations. By way of example, in a SISO system where the set partitioning, e.g., is $J=\{2; 1; \ldots; 1\}$. That is, the number of states is 2 and number of parallel transition is 4.

Figure 5:
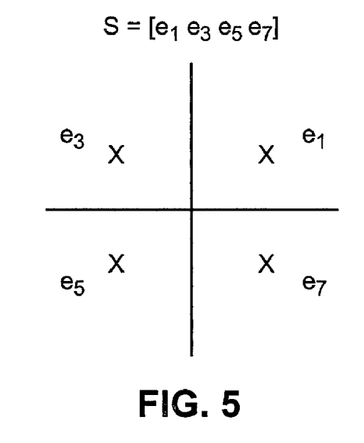
FIG. 5 illustrates a representation of the constellation of the symbols of a symbol set defined pursuant to operation of an embodiment of the present invention.

The received signal (after prefilter) at time k is given as:

$$y_k = b_0 a_k + \sum_{i=1}^{L} b_i a_{k-i} + n_k \qquad \text{(equation 3)}$$

Where $b_0; \ldots; b_L$ are the effective channel coeffients and $a_k; \ldots a_{k-L}$ are the transmitted symbols. In the context of parallel transitions, all the ISI symbols $a_{k-1}; \ldots a_{k-L}$ are known, and the transition symbol $a_k$ belongs to a known set S. Without loss of generality, an example of a constellation set 92 in which $a_k \in S=\{e_1; e_3; e_5; e_7\}$ is shown in FIG. 5 (a rotation operation is needed if the set contains the other 4 constellation points). In order to determine the most likely $a_k \in S$, the following optimization problem is solved:

$$a_k^{opt} = \text{argmin} \|z_k - b_0 a_k\|^2 \qquad \text{(equation 4)}$$

where $$z_k = y_k \sum_{i=1}^{L} b_i a_{k-i}$$

is the ISI-free received signal. Note here by adopting the minimum distance metric, $n_k$ is assumed to be Gaussian noise. The brute force solution to (4) is to compute all the 4 distances. However, with some simplification the geometric structure of the constellation can be exploited to derive the slicing solution. First, it is easy to show that (4) is equivalent to:

$$a_k^{opt} = \text{argmax} |\text{Re}(a_k \hat{z}_k^*)| = \text{argmax}(a_{k,r} \hat{z}_{k,r}^* + a_{k,i} \hat{z}_{k,i}^*) \qquad \text{(equation 5)}$$

Where * stands for complex conjugate and subscript r and i stands for the real and imaginary part of a complex number. Also, $\hat{Z}_k = b_0^* z_k$. Now it is clear that with the 4 constellation points of the set given as in FIG. 5, the slicing rule is as follows:

$$a_{k,r}^{opt} = \frac{\sqrt{2}}{2} * \text{sign}(\hat{z}_{k,r}) = \text{and } a_{k,i}^{opt} = \frac{\sqrt{2}}{2} * \text{sign}(\hat{z}_{k,i}) \quad \text{(equation 6)}$$

It follows that $$a_k^{opt} = a_{k,r}^{opt} + j a_{k,i}^{opt}$$

and the minimum metric of all the parallel transitions in this example is obtained by computing $$|z_k - b_0 a_k^{opt}|^2.$$

Note the number of Euclidean distance computations is reduced from 4 to 1 with slicing method.

The above discussion is extended to the slicing of parallel transitions in MIMO trellis. With M simultaneously transmitted data streams, at time k the sampled received signal vector at the equalizer is given in (1). Again, in the context of parallel transition, knowledge is assumed of $a_{k-1}; \ldots; a_{k-L}$ and $a_k \in S^M$ which is a M tuple of sets, note $a_k = [a_{k;1}; \ldots a_{k;M}]^T$. The ISI free received signal in a MIMO system is:

$$z_k = y_k - \sum_{i=1}^{L} B_i a_{i-k} = B_0 a_k + n_k \quad \text{(equation 7)}$$

The assumption noted above with respect to the SISO example and assume each set to be $S = \{e_1; e_3; e_5; e_7\}$. Note that the number of parallel transitions is now $4^M$ for the MIMO case. Similar to the SISO case, the optimal path denoted by $a_k^{opt}$ is achieved by solving:

$$a_k^{opt} = \text{argmin}(z_k - B_0 a_k)^H R_{nn}^{-1}(z_k - B_0 a_k) \quad \text{(equation 8)}$$

To solve (8), the brute force solution is to go through all the $4^M$ paths and find the one with minimum metric. Due to the cross terms between different symbols $a_{k;1}; \ldots a_{k;M}$ in (8), a simple slicing operation like (6) does not exist for MIMO trellis. Here a group slicing method is proposed that reduces the number of metric computation by 4 times over the direct solution method. The idea is to break all the paths into $4^{M-1}$ groups, which corresponds to all the possibility of M−1 symbols. For example, one possible grouping is denoted by $\Omega(a_{k,2}, \ldots a_{k,M})$, which is parameterized by a fixed set of $a_{k;2}; \ldots a_{k;M}$. There are four paths inside each group, each path has the same $a_{k;2}; \ldots; a_{k;M}$ but different $a_{k;1}$. Now equation (8) is transformed into a two-step optimization: first, find the optimal $a_{k;1}$ for a given group $\Omega(a_{k,2}, \ldots a_{k,M})$ (for a set of fixed $a_{k;2}; \ldots; a_{k;M}$); second, go through all the possibilities of the groups and find the overall minimum. Mathematically, equation (8) is rewritten as:

$$a_k^{opt} = \arg\min_{(a_{k,2}, \ldots a_{k,M})} \left[ \min_{a_k \in \Omega(a_{k,2}, \ldots a_{k,M})} (z_k - B_0 a_k)^H R_{nn}^{-1}(z_k - B_0 a_k) \right] \quad \text{(equation 9)}$$

Since the minimization inside the bracket is only with respect to $a_{k;1}$, it can be further reduced. To do that, an assumption that $R_{nn}^{-1} = \lfloor \sigma_1^2, \ldots, \sigma_M^2 \rfloor$ is diagonal is made. Note that if it is not, it can be factored out as $$R_{nn}^{-1} = LDL^H$$

where L is lower triangular and $D = \text{diag}[d_1 \ldots d_M]$ is diagonal, then the L can be absorbed in $z_k$ and $B_0$ so that the cost function becomes $(\hat{Z}_k - \hat{B}_0 a_k)^H D(\hat{Z}_k - \hat{B}_0 a_k)$ with $\hat{Z}_k = L^H z_k$ and $\hat{B}_0 = L^H B_0$. Now with this assumption, the minimization problem inside the bracket of equation (9) is reduced to the following single variable optimization problem after some simplification.

$$a_k^{opt} = \text{argmin} \sum_{m=1}^{M} a_m^2 \| \tilde{z}_m - \tilde{b}_m a_{k,i} \|^2 \quad \text{(equation 10)}$$

Where $$\tilde{Z}_m = Z_{k,m} - \sum_{n \neq 1} (B_0)_{mn} a_{k,n} \cdot \text{And } \tilde{b}_m = (B_0)_{m1} (10)$$

(where $(B_0)_{mn}$ means the element on the $m^{th}$ row and $n^{th}$ column of $B_0$) can be further reduced as:

$$a_{k,1}^{opt} = \text{argmax} \, \text{Re}(a_{k,1} u^*) \quad \text{(equation 11)}$$

where $$u = \sum_{m=1}^{M} \sigma_m^2 \tilde{b}_m^* \tilde{z}_m.$$

Note (11) is in exactly the same form as (5) and therefore the slicing rules derived in (6) can be applied to get the optimal $a_{k,1}$.

Once the optimal $a_{k;1}$ is determined for each group $\Omega(a_{k,2}, \ldots a_{k,M})$, it can be used to compute the distance metric for that group. After that, the outer level of minimization in (9) is performed by searching the minimum of the $4^{M-1}$ group metrics. In conclusion, the group slicing method requires $4^{M-1}$ Euclidean metric computations as opposed to the $4^M$ needed by the direct solution.

A decoupled slicing method is alternately used to solve equation (8). In the decoupled slicing method, each of the M symbols in $a_k$ will be optimized separately and the number of Euclidean metric computation is reduced from $4^M$ to 1. A sufficient condition exists in order for this method to be optimal. To see this, equation (8) is rewritten as:

$$\alpha_k^{opt} = \operatorname{argmin}(\tilde{z}_k - a_k)^H B_0^H R_{nn}^{-1} B_0 (\tilde{z}_k - a_k) \quad \text{(equation 12)}$$

Where $\tilde{z}_k = B_0^{-1} z_k$. The following sufficient condition is claimed for decoupled slicing to be optimal:

$$B_0^H R_{nn}^{-1} B_0 = D \quad \text{(equation 13)}$$

where $D = \operatorname{diag}[d_1; \ldots d_M]$ is some diagonal matrix. If this condition holds, (12) becomes:

$$\alpha_{k,1}^{opt} = \operatorname{argmin} \sum_{m=1}^{M} d_m \|\tilde{z}_{k,m} - a_{k,m}\|^2 \quad \text{(equation 14)}$$

It is observed that in (14) that metrics associated with the symbols are decoupled and there are no cross terms. Therefore, equation (14) can be decoupled into M separate optimization problems.

$$\alpha_{k,1}^{opt} = \operatorname{argmin} d_m \|\tilde{z}_{k,m} - a_{k,m}\|^2, m = 1, \ldots, M \quad \text{(equation 15)}$$

Now the SISO slicing rule (6) can be applied to detect each symbol. As we pointed out before, when the sufficient condition (13) is satisfied, the decoupled slicing method is optimal. However, it may be difficult to design a prefliter that satisfies this condition. If the condition (13) does not hold, decoupled slicing can still be used as a sub-optimal method. To this end, we ignore the off-diagonal elements in the matrix $$B_0^H R_{nn}^{-1} B_0$$

and solve the following problem to get $$\alpha_k^{opt}:$$

$$\alpha_{k,1}^{opt} = \alpha_{k,1}^{opt} = \operatorname{argmin}(\tilde{z}_k - a_k)^H R_{DD} (z_k - a_k) \quad \text{(equation 16)}$$

where $$R_{DD} = \operatorname{diag}(B_0^H R_{nn}^{-1} B_0)$$

is a diagonal matrix whose diagonal elements are the same as the matrix $$(B_0^H R_{nn}^{-1} B_0).$$

Now the decoupled slicing method gives can be used to solve (16).

The decoupled slicing method greatly reduces the detection complexity of the parallel transition. However, if the sufficient condition for optimality is not satisfied, the performance loss is significant compared with the group slicing method. Another suboptimal slicing method, namely the successive slicing method is alternately used that does not require the sufficient condition and delivers better trade-off in terms of the complexity and performance. On one hand, the complexity of the successive slicing algorithm is about the same as the decoupled slicing algorithm; on the other hand, the performance loss against the group slicing algorithm is smaller.

The starting point is equation (12).

$$(B_0^H R_{nn}^{-1} B_0)$$

is assumed to be a positive definite hermitian matrix. A symmetric LU decomposition always exists for such a matrix:

$$B_0^H R_{nn}^{-1} B_0 = LU \text{ and } L = U^H \quad \text{(equation 17)}$$

where U is a upper triangle matrix whose elements are denoted by $U_{ij}$, note $U_{ij}=0$; i>j. Substitute (17) into (12) to obtain:

$$\alpha_{k,1}^{opt} = \operatorname{argmin} \|U(\tilde{z}_k - a_k)\|^2 \quad \text{(equation 18)}$$
$$= \operatorname{argmin} \sum_{i=1}^{M} \left| \sum_{j \geq i}^{j \leq M} (U_{i,j} \tilde{z}_{k,j} - a_{k,j}) \right|^2$$

The cost function of (18) has a unique structure. First, note it is the sum of M square metric terms, indexed by $i=1; \ldots M$. Furthermore, the $M^{th}$ term is only a function of $a_{k,M}$ while $M-1^{th}$ term is a function of $a_{k,M}$; $a_{k,M-1}$, etc. This suggest a successive slicing algorithm which detects the symbols in the order of $a_{k,M}$; $a_{k,M-1}; \ldots a_{k,1}$. The algorithm is outlined as follows:

1. Start from i=M, use basic SISO slicing to detect $a_{k,M}$ from a $$\alpha_{k,M}^{opt} = \operatorname{argmin}_{a_{k,M} \in S} \left| (U_{MM}(\tilde{Z}_{k,M} - a_{k,M})) \right|^2$$

2. Suppose detection is made of $$\partial_{k,i}^{opt}, \ldots \partial_{k,i+1}^{opt}, \text{ then } \partial_{k,t}^{opt}$$

is given by:

$$a_k^{opt} = \text{argmin} \left| \sum_{j>i}^{j\leq M} U_{ij}(\tilde{z}_{k,j} - a_{k,j}^{opt}) + U_{ii}(\tilde{z}_{ki} - a_{k,i}) \right|^2 = \text{argmin}|(U_{ii})^2|(c+\tilde{z}_{k,i}) - a_{k,j}|^2$$

where $$c = \frac{1}{U_{ii}} \sum_{j>i}^{j\leq M} (U_{ij}\tilde{z}_{k,j} - a_{k,j}^{opt})$$

3. Let 1=1, if 1>0, repeat step 2; otherwise exit.

It is observed that only M slicing operation and 1 Euclidean metric computation is needed for the successive slicing. This is the same as the decoupled slicing. The only overhead comes from the preparation of each slicing operation, where the constant c is computed.

Figure 6:
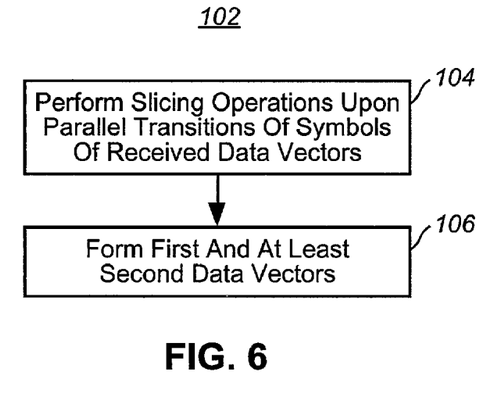
FIG. 6 illustrates a method flow diagram listing the method of operation of the method of an embodiment of the present invention.

FIG. 6 illustrates a method, shown generally at 102, of operation of an embodiment of the present invention. The method facilitates joint detection of values of first and at least second received data vectors.

First, and as indicated by the block 104, slicing operations are performed upon parallel transitions of successive symbols of the first and at least second received data vectors. Then, and as indicated by the block 106, a first equalized data vector and at least a second equalized data vector are formed. The data vectors are formed responsive to the slicing operations performed at the step 104.

Joint equalization is thereby performed upon received data vectors, received at a receiving station of a MIMO system. Joint equalization is performed while necessitating computations of reduced complexity levels relative to conventional joint equalization techniques. Because of the lessened complexity levels, the joint equalization is implementable in state of the art processing devices.

The previous descriptions are of preferred examples for implementing the invention, and the scope of the invention should not necessarily be limited by this description. The scope of the present invention is defined by the following claims:

We claim:

1. In a multiple input, multiple-output communication system having a receiving station for receiving a first received data vector and at least a second received data vector transmitted thereto upon a communication channel, an improvement of apparatus for the receiving station facilitating joint detection of values of the first and at least second received data vectors, said apparatus comprising:

a joint equalizer coupled to receive indications of the first and at least second received vectors received at the receiving station, said joint equalizer for forming a first equalized data vector and at least second equalized data vector, the first and at least second equalized data vectors, respectively, formed of equalized symbols, the equalized symbols generated pursuant to slicing operations performed upon parallel transition of successive symbols of the indications of the first and at least second received data vectors.

2. The apparatus of claim 1 wherein the first and at least second equalized vectors define optimal paths formed of minimum metrics.

3. The apparatus of claim 1 wherein the slicing operations performed by said joint equalizer to generate the equalized symbols of the first and at least second equalized data vectors, respectively, comprise group slicing operations in which the first and at least second received data vectors are separated into a first received data vector group and at least a second received data vector group and wherein an optimal path is defined for each of the first and at least second received data vector groups.

4. The apparatus of claim 3 wherein the group slicing operations performed by said joint equalizer to generate the equalized symbols further comprises selecting one of the optimal paths defined for each of the first and at least second received data vector groups as a group-optimal path.

5. The apparatus of claim 4 wherein the group-optimal path selected by said joint equalizer amongst the optimal paths comprises the optimal path exhibiting an overall minimum path length.

6. The apparatus of claim 1 wherein the slicing operations performed by said joint equalizer to generate the equalized symbols of the first and at least second equalized data vectors, respectively, comprise decoupled slicing operations in which each of successive sets of symbols of the indications of the first and at least second received data vectors are successively optimized, the symbols of the successive sets decoupled from one another.

7. The apparatus of claim 6 wherein the successive sets of symbols are of numbers corresponding to a number M of multiple inputs of the multiple-input, multiple-output communication system.

8. The apparatus of claim 7 wherein optimization of the parallel transition between successive sets of the symbols is provided by selection at said joint equalizer of minimum metric paths.

9. The apparatus of claim 1 wherein the slicing operations performed by said joint equalizer to generate the equalized symbols of the first and at least second equalized data vectors, respectively, comprise successive slicing operations in which successive sets of symbols of the indications of the first and at least second received data vectors are successively optimized.

10. The apparatus of claim 9 wherein successive sets of symbols are of numbers corresponding to a number M of multiple inputs to the multiple-input, multiple-output communication system.

11. The apparatus of claim 9 wherein optimization of parallel transitions between successive sets of the symbols is provided by selection of minimum path metrics.

12. The apparatus of claim 1 wherein the multiple-input, multiple-output communication system comprises a cellular radio communication system, wherein the receiving station comprises a receive post of a cellular mobile station and wherein said joint equalizer is embodied at the cellular mobile station.

13. The apparatus of claim 1 wherein the multiple-input, multiple-output communication system comprises a cellular radio communication system, wherein the receiving station comprises a receive part of a fixed-site transceiver and wherein said joint equalizer is embodied at the fixed-site transceiver.

14. The apparatus of claim 1 wherein the receiving station comprises a decision feedback sequence estimator and wherein said joint equalizer forms a portion of the decision feedback sequence estimator.

15. In a method for communicating in a multiple input, multiple-output communication system having a receiving station for receiving a first received data vector and at least a second received data vector transmitted thereto upon a communication channel, an improvement of a method for the receiving station facilitating joint detection of values of the first and at least second received data vectors, said method comprising: performing slicing operations upon parallel transitions of successive symbols of the first and at least second received data vectors, respectively; and forming a first equalized data vector and at least a second equalized data vector responsive to the slicing operations performed during said operation of performing.

16. The method of claim 15 wherein said operation of performing the slicing operations upon the parallel transitions comprise performing group slicing operations by separating the first and at least second secured data vectors into a first received data vector group; and defining an optimal path for each of the first and at least second received data vector groups.

17. The method of claim 16 further comprising the operation of selecting one of the optimal paths defined during said operation of defining as a group-optimal path.

18. The method of claim 17 wherein the group-optimal path selected during said operation of selecting exhibits an overall minimum path length.

19. The method of claim 15 wherein said operation of performing the slicing operations upon the parallel transitions comprise performing decoupled slicing operations upon the parallel transitions.

20. The method of claim 15 wherein said operation of performing the slicing operations upon the parallel transitions comprise performing successive slicing operations upon the parallel transitions.

21. The apparatus of claim 1, wherein the slicing operations reduce a number of path metric computations which determine a most likely signal path among the parallel transition of successive symbols.

22. The method of claim 15, wherein the slicing operations reduce a number of path metric computations which determine a most likely signal path among the parallel transitions of successive symbols.

* * * * *